(12) United States Patent
Kim et al.

(10) Patent No.: US 11,267,221 B2
(45) Date of Patent: Mar. 8, 2022

(54) LAMINATED GLASS STRUCTURES FOR ELECTRONIC DEVICES AND ELECTRONIC DEVICE COVERS

(71) Applicant: CORNING INCORPORATED, Corning, NY (US)

(72) Inventors: Jin Su Kim, Seoul (KR); Dean Michael Thelen, Addison, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/041,876

(22) PCT Filed: Mar. 27, 2019

(86) PCT No.: PCT/US2019/024384
§ 371 (c)(1),
(2) Date: Sep. 25, 2020

(87) PCT Pub. No.: WO2019/191300
PCT Pub. Date: Oct. 3, 2019

(65) Prior Publication Data
US 2021/0008832 A1 Jan. 14, 2021

Related U.S. Application Data (60) Provisional application No. 62/649,229, filed on Mar. 28, 2018.

(51) Int. Cl.
*B32B 7/027* (2019.01)
*B32B 17/06* (2006.01)

(52) U.S. Cl.
CPC .............. *B32B 7/027* (2019.01); *B32B 17/06* (2013.01); *B32B 2250/03* (2013.01);
(Continued)

(58) Field of Classification Search
CPC ...... B32B 7/027; B32B 17/06; B32B 2250/03; B32B 2307/30; B32B 2307/734;
(Continued)

(56) References Cited

U.S. PATENT DOCUMENTS

| 4,130,680 A | 12/1978 | Ference et al. |
| 8,675,358 B2 * | 3/2014 | Shin ................ H04M 1/0283 361/679.55 |

(Continued)

FOREIGN PATENT DOCUMENTS

| GB | 2315266 A | 1/1998 |
| JP | 2000-178036 A | 6/2000 |
| WO | WO-2016065118 A1 * | 4/2016 .......... C03B 17/02 |

OTHER PUBLICATIONS

Buch et al; "Design and Demonstration of Highly Miniaturized Low Cost Panel Level Glass Package for MEMS Sensors"; 2017 IEEE 67th Electronic Components and Technology Conference; 10 Pages.
(Continued)

*Primary Examiner* — David Sample
*Assistant Examiner* — Donald M Flores, Jr.

(57) ABSTRACT

A laminated glass structure is provided that includes: a core glass layer having a first coefficient of thermal expansion (CTE); and a plurality of clad glass layers, each having a CTE that is lower than or equal to the first CTE of the core glass layer. A first of the clad layers is laminated to a first surface of the core glass layer and a second of the clad layers is laminated to a second surface of the core glass layer. Further, the total thickness of the core glass layer and the clad glass layers ranges from about 0.1 mm to about 3 mm. In addition, the laminated glass structure is characterized by a transmission power of at least 75% and at least 55% for signals at 28 GHz and 60 GHz, respectively, as calculated in a Three-Layer Model.

20 Claims, 8 Drawing Sheets

(52) U.S. Cl.
CPC ..... *B32B 2307/30* (2013.01); *B32B 2307/734* (2013.01); *B32B 2457/20* (2013.01); *Y10T 428/2495* (2015.01); *Y10T 428/24942* (2015.01)

(58) Field of Classification Search
CPC . B32B 2457/20; B32B 7/02; Y10T 428/2495; Y10T 428/24942; G06F 2200/1634; G06F 1/1656; G06F 1/1626; H04M 1/0266
See application file for complete search history.

(56) References Cited

U.S. PATENT DOCUMENTS

| | | |
|---|---|---|
| 8,917,220 B2 | 12/2014 | Ziolkowski et al. |
| 9,099,782 B2 | 8/2015 | Ziolkowski |
| 2010/0090902 A1 | 4/2010 | Thompson et al. |
| 2012/0098708 A1 | 4/2012 | Takasu |
| 2013/0157729 A1 | 6/2013 | Tabe |
| 2014/0334006 A1 | 11/2014 | Adib et al. |
| 2017/0305788 A1 | 10/2017 | Nikulin |

OTHER PUBLICATIONS

International Search Report and Written Opinion of the International Searching Authority; PCT/US2019/024384; dated Jul. 2, 2019; 9 Pages; Commissioner for Patents.

* cited by examiner

LAMINATED GLASS STRUCTURES FOR ELECTRONIC DEVICES AND ELECTRONIC DEVICE COVERS

CROSS-REFERENCE TO RELATED APPLICATIONS

This application claims the benefit of priority under 35 U.S.C. § 371 of International Application No. PCT/US2019/024384, filed on Mar. 27, 2019, which claims the benefit of priority under 35 U.S.C. § 119 of U.S. Provisional Application No. 62/649,229, filed Mar. 28, 2018, the content of each of which is incorporated herein by reference in its entirety.

FIELD

The present disclosure relates to laminated glass structures and, more particularly, to laminated glass structures and articles configured for electronic devices.

BACKGROUND

Digital technologies continue to expand, particularly in terms of data connectivity and processing rates. For example, processing rates on the order of 1 Gbits/s are expanding to rates on the order of tens of Gbits/s. The corresponding electronic device technology to achieve these data rates likely will result in an expansion of signal transmission and receiving frequencies on the order of 1 GHz to the order of tens of GHz.

As these signal frequencies increase to accommodate increase data processing rates, the technical specifications and requirements related to absorption loss associated with the insulating materials employed in these devices take on greater importance. For example, as these higher frequency communication signals are used in these devices, the signals must pass through various physical barriers that otherwise block the antenna in the devices. Examples of these physical barriers are shields, such as the device cases (e.g., as employed in smartphones), and automotive windows. The intended function of these barriers (e.g., cases, covers, windows, etc.) is generally not electrical in nature (rather, the functions of these barriers include optical, mechanical, and other non-electrical environmental functions). Nevertheless, these barriers also play a role in the electrical performance of these devices, particularly as they are configured to handle increased signal frequencies. In particular, these physical barrier materials are not perfect insulators and are therefore associated with dielectric loss that can affect the intensity of signals transmitted through them.

Accordingly, there is a need for structures suitable for electronic device covers and other comparable applications that can enable higher frequency communication in devices without a significant reduction in performance as it relates to other non-electrical device requirements.

SUMMARY

According to a first aspect, a laminated glass structure is provided that includes: a core glass layer having a first coefficient of thermal expansion (CTE); and a plurality of clad glass layers, each having a CTE that is lower than or equal to the first CTE of the core glass layer. A first of the clad layers is laminated to a first surface of the core glass layer and a second of the clad layers is laminated to a second surface of the core glass layer. Further, the total thickness of the core glass layer and the clad glass layers ranges from about 0.1 mm to about 3 mm. In addition, the laminated glass structure is characterized by a transmission power of at least 75% and at least 55% for signals at 28 GHz and 60 GHz, respectively, as calculated in a Three-Layer Model.

According to a second aspect, the structure of aspect 1 is provided, wherein the total thickness of the core glass layer and the clad glass layers ranges from about 0.1 mm to about 1 mm.

According to a third aspect, the structure of aspect 1 is provided, wherein each of the plurality of clad glass layers comprise an ion-exchangeable glass composition.

According to a fourth aspect, the structure of aspect 3 is provided, wherein each of the plurality of glass layers further comprises a compressive stress region formed from an ion-exchange process.

According to a fifth aspect, the structure of any one of aspects 1-4 is provided, wherein a ratio of the thickness of the core glass layer to the total thickness of the plurality of the clad glass layers is from about 0.05 to 10.

According to a sixth aspect, the structure of any one of aspects 1-4 is provided, wherein a ratio of the thickness of the core glass layer to the total thickness of the plurality of the clad glass layers is from about 2.5 to 7.0.

According to a seventh aspect, an electronic device is provided that includes: a housing comprising front, back and side surfaces; and electrical components that are at least partially inside the housing. Further, a laminated glass structure is disposed as part of the housing, the laminated glass structure includes: a core glass layer having a first coefficient of thermal expansion (CTE); and a plurality of clad glass layers, each having a CTE that is lower than or equal to the first CTE of the core glass layer. A first of the clad layers is laminated to a first surface of the core glass layer and a second of the clad layers is laminated to a second surface of the core glass layer. Further, the total thickness of the core glass layer and the clad glass layers ranges from about 0.1 mm to about 3 mm. In addition, housing is characterized by a transmission power of at least 75% and at least 55% for signals at 28 GHz and 60 GHz, respectively, as calculated through the housing in a Three-Layer Model.

According to an eighth aspect, the device of aspect 7 is provided, wherein the total thickness of the core glass layer and the clad glass layers ranges from about 0.1 mm to about 1 mm.

According to a ninth aspect, the device of aspect 7 is provided, wherein each of the plurality of clad glass layers comprise an ion-exchangeable glass composition.

According to a tenth aspect, the device of aspect 9 is provided, wherein each of the plurality of glass layers further comprises a compressive stress region formed from an ion-exchange process.

According to an eleventh aspect, the device of any one of aspects 7-10 is provided, wherein a ratio of the thickness of the core glass layer to the total thickness of the plurality of the clad glass layers is from about 0.05 to 10.

According to a twelfth aspect, the device of any one of aspects 7-10 is provided, wherein a ratio of the thickness of the core glass layer to the total thickness of the plurality of the clad glass layers is from about 2.5 to 7.0.

According to a thirteenth aspect, a laminated glass structure for an electronic device is provided that includes: a core glass layer having a first coefficient of thermal expansion (CTE); and a plurality of clad glass layers, each having a CTE that is lower than or equal to the first CTE of the core glass layer. A first of the clad layers is laminated to a first surface of the core glass layer and a second of the clad layers is laminated to a second surface of the core glass layer. Further, the total thickness of the core glass layer and the clad glass layers ranges from about 0.1 mm to about 3 mm. In addition, the laminated glass structure is characterized by a thickness weighted average dielectric constant ($D_k$) of less than 5.5 for the plurality of clad glass layers and the core glass layer.

According to a fourteenth aspect, the structure of aspect 13 is provided, wherein the total thickness of the core glass layer and the clad glass layers ranges from about 0.1 mm to about 1 mm.

According to a fifteenth aspect, the structure of aspect 13 is provided, wherein each of the plurality of clad glass layers comprises an ion-exchangeable glass composition.

According to a sixteenth aspect, the structure of aspect 15 is provided, wherein each of the plurality of glass layers further comprises a compressive stress region formed from an ion-exchange process.

According to a seventeenth aspect, the structure of any one of aspects 13-16 is provided, wherein a ratio of the thickness of the core glass layer to the total thickness of the plurality of the clad glass layers is from about 0.05 to 10.

According to an eighteenth aspect, the structure of any one of aspects 13-16 is provided, wherein a ratio of the thickness of the core glass layer to the total thickness of the plurality of the clad glass layers is from about 2.5 to 7.0.

According to a nineteenth aspect, an electronic device is provided that includes: a housing comprising front, back and side surfaces; and electrical components that are at least partially inside the housing. Further, a laminated glass structure is disposed as part of the housing, the laminated glass structure includes: a core glass layer having a first coefficient of thermal expansion (CTE); and a plurality of clad glass layers, each having a CTE that is lower than or equal to the first CTE of the core glass layer. A first of the clad layers is laminated to a first surface of the core glass layer and a second of the clad layers is laminated to a second surface of the core glass layer. Further, the total thickness of the core glass layer and the clad glass layers ranges from about 0.1 mm to about 3 mm. In addition, the laminated glass structure is characterized by a thickness weighted average dielectric constant ($D_k$) of less than 5.5 for the plurality of clad glass layers and the core glass layer.

According to a twentieth aspect, the device of aspect 19 is provided, wherein the total thickness of the core glass layer and the clad glass layers ranges from about 0.1 mm to about 1 mm.

According to a twenty-first aspect, the device of aspect 19 is provided, wherein each of the plurality of clad glass layers comprises an ion-exchangeable glass composition.

According to a twenty-second aspect, the device of aspect 21 is provided, wherein each of the plurality of glass layers further comprises a compressive stress region formed from an ion-exchange process.

According to a twenty-third aspect, the device of any one of aspects 19-21 is provided, wherein a ratio of the thickness of the core glass layer to the total thickness of the plurality of the clad glass layers is from about 0.05 to 10.

According to a twenty-fourth aspect, the device of any one of aspects 19-21 is provided, wherein a ratio of the thickness of the core glass layer to the total thickness of the plurality of the clad glass layers is from about 2.5 to 7.0.

Additional features and advantages will be set forth in the detailed description which follows, and in part will be readily apparent to those skilled in the art from the description or recognized by practicing the disclosure as exemplified in the written description and the appended drawings. It is to be understood that both the foregoing general description and the following detailed description are merely exemplary of the disclosure, and are intended to provide an overview or framework to understanding the nature and character of the disclosure as it is claimed.

The accompanying drawings are included to provide a further understanding of principles of the disclosure, and are incorporated in and constitute a part of this specification. The drawings illustrate one or more embodiment(s), and together with the description serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

The term "CTE," as used herein, refers to the coefficient of linear thermal expansion of a glass material, element or the like in the disclosure (e.g., a core glass layer) as averaged over a temperature range from 20° C. to 300° C. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

The terms "relatively low CTE" and "low CTE" are used interchangeably in the disclosure with regard to clad glass layers with a starting glass composition (e.g., prior to drawing, laminating, and ion exchange) having a CTE that is lower than the CTE of the starting composition of the core glass by at least about $10 \times 10^{-7}$/° C. The CTE of clad glass layers may also be lower than the CTE of the core glass layer by an amount in the range from about $10 \times 10^{-7}$/° C. to about $70 \times 10^{-7}$/° C., from about $10 \times 10^{-7}$/° C. to about $60 \times 10^{-7}$/° C., or from about $10 \times 10^{-7}$/° C. to about $50 \times 10^{-7}$/° C. For example, the core glass may have a CTE of about $100 \times 10^{-7}$/° C. and the clad glass layers may have a CTE of about $50 \times 10^{-7}$/° C., such that there is a difference of about $50 \times 10^{-7}$/° C. between the CTE of the core glass and the clad glass layers.

The terms "thin glass" or "relatively thin glass" are used interchangeably in relation to laminated glass structures in the disclosure and intended to mean a laminated structure having a total thickness not exceeding about 3 mm.

The terms "mechanically strengthened glass laminate," "mechanically strengthened glass laminated structure" and "mechanical strengthening" are used in relation to the laminated glass structures of the disclosure to mean a glass laminate that has been formed by laminating a high CTE core glass to low CTE clad glass layer(s), thereby creating compressive stresses in the clad glass layers when the laminate is cooled following lamination. These compressive stresses can offset externally applied mechanical stresses, which have the net effect of strengthening the laminate.

The terms "chemically strengthened" and "chemical strengthening," as used in the present description, are intended to mean glass (e.g., a core glass layer, a clad glass layer, etc.) that has been strengthened using an ion exchange process, as understood by those with ordinary skill in the field of the disclosure, to create compressive stresses in the surface region of the glass at one or more of its primary surfaces and edges.

The terms "laminated glass structure," "laminated glass design," and "laminated glass article" are used in their broadest sense to include any object made wholly or partly of glass and/or glass-ceramic materials. For example, in some implementations of the laminated glass structures of the disclosure, the structure includes a core layer having a glass composition and a pair of clad layers having a glass-ceramic composition. Unless otherwise specified, all compositions are expressed in terms of mole percent (mol %). Coefficients of thermal expansion (CTE) are expressed in terms of $10^{-7}$/° C. and represent a value measured over a temperature range from about 20° C. to about 300° C., unless otherwise specified.

The term "thickness weighted average dielectric constant $(D_k)$" refers to the dielectric constant of a laminated glass structure, design or article of the disclosure. In particular, the thickness weighted average dielectric constant $(D_k)$ of a laminated structure is calculated by multiplying the thickness of each layer of the laminated structure with its estimated or measured dielectric constant, summing the products for each of the layers, and then dividing the sum by the total thickness of the laminated glass structure.

Disclosed herein are various laminated glass structures, designs and articles. Exemplary laminated glass articles in the disclosure are suitable for electronic devices, vehicles, buildings and other applications in the form of electronic device covers, cases and structures, display glass, windows and other similarly configured substrates. These laminated structures can include a core glass layer and a plurality of clad glass layers, each laminated to the core glass layer and having a coefficient of thermal expansion (CTE) that is lower than or equal to the CTE of the core glass layer. Further, exemplary laminated glass articles are characterized by a transmission power of at least 75% and at least 55% for signals at 28 GHz and 60 GHz, respectively, as calculated in a Three-Layer Model. Further, these laminated glass articles can be characterized by a thickness weighted average dielectric constant $(D_k)$ of less than 5.5 for the plurality of the clad glass layers and the core glass layer.

The laminated glass structures, designs and design approaches for electronic devices and vehicular applications that are described herein offer several advantages over conventional substrates. For instance, the laminated structures of the disclosure demonstrate improved signal reflection performance over conventional substrate materials (e.g., monolithic glass, ceramic, polycarbonate, etc.). Signal reflection is typically more significant than material absorptive losses in the higher frequency applications envisioned by some of the applications in the field of the disclosure. As the teachings and modeling work of the disclosure have shown, reflection-based losses are generally controlled by the dielectric constant of the substrate material(s), particularly the clad materials in laminates. Accordingly, the laminated glass structures of the disclosure can advantageously be configured to minimize signal reflection losses through the use of low dielectric constant cladding materials and higher dielectric constant core materials. Another advantage of these laminated glass structures is that they can exhibit high mechanical strength, resulting from the development of compressive stress through the lamination of glass materials with dissimilar CTEs. A further advantage of these structures is that they can be scaled to larger sizes relative to conventional ceramic substrates, particularly as their mechanical properties are not as influenced by flaw size distributions.

Figure 1A:
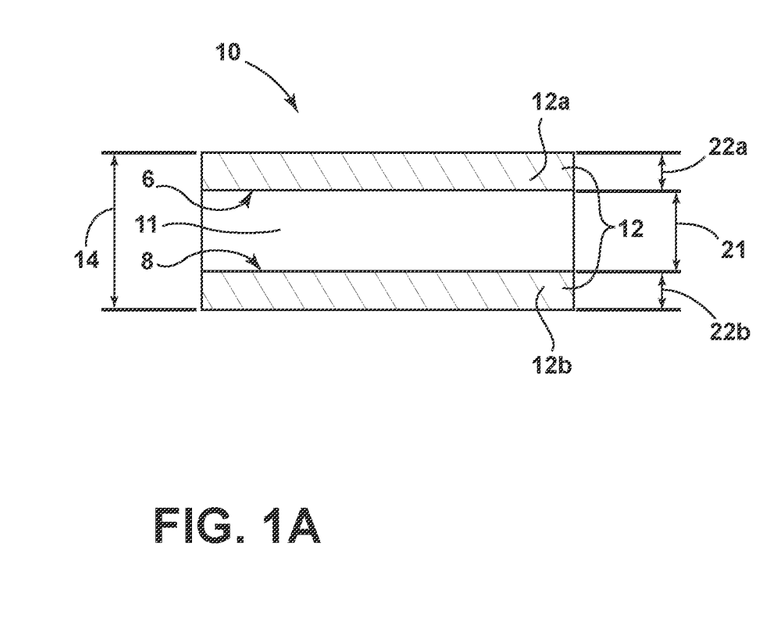
FIG. 1A is a cross-sectional, schematic view of a laminated glass structure, according to an example of the disclosure.

Referring now to FIG. 1A, an exemplary, laminated glass structure 10 is provided according to an embodiment of the disclosure. The laminated structure 10 includes a core glass layer 11 having a thickness 21 and a first coefficient of thermal expansion (CTE); and a plurality of clad glass layers 12, each having a CTE that is lower than or equal to the first CTE of the core glass layer 11. A first of the clad layers 12a, having a thickness 22a, is laminated to a first surface 6 of the core glass layer. A second of the clad layers 12b, having a thickness 22b, is laminated to a second surface 8 of the core glass layer. Further, the total thickness 14 of the core glass layer 11 and the clad glass layers 12 ranges from about 0.1 mm to about 3 mm.

In some embodiments of the laminated glass structure 10 (see FIG. 1A), the total thickness 14 is from about 0.1 mm to about 3 mm. In some implementations, the total thickness 14 of the laminated glass structure 10 does not exceed about 3 mm, or about 2.5 mm. Further, in some aspects, the total thickness 14 ranges from about 0.1 mm to about 3.0 mm, from about 0.15 mm to about 3 mm, from about 0.3 mm to about 3 mm, from about 0.1 mm to about 1 mm, from about 0.15 mm to about 2.5 mm, from about 0.3 mm to about 2.5 mm, or all thickness values between these values.

Referring again to the laminated glass structure 10 depicted in FIG. 1A, the thickness 21 of the core glass layer 12 can range from about 0.01 mm to about 3 mm, from about 0.01 mm to about 2.5 mm, from about 0.01 mm to about 2 mm, from about 0.1 mm to about 3 mm, from about 0.1 mm to about 2.5 mm, from about 0.1 mm to about 2 mm, from about 0.2 mm to about 3 mm, from about 0.2 mm to about 2.5 mm, from about 0.2 mm to about 2 mm, from about 0.3 mm to about 3 mm, from about 0.3 mm to about 2.5 mm, from about 0.3 mm to about 2 mm, and all values between these levels.

Still referring to the laminated glass structure 10 depicted in FIG. 1A, the thicknesses 22a, 22b of the clad glass layers 12a, 12b can each range from about 0.01 mm to about 3 mm, from about 0.01 mm to about 2.5 mm, from about 0.01 mm to about 2 mm, from about 0.1 mm to about 3 mm, from about 0.1 mm to about 2.5 mm, from about 0.1 mm to about 2 mm, from about 0.2 mm to about 3 mm, from about 0.2 mm to about 2.5 mm, from about 0.2 mm to about 2 mm, from about 0.3 mm to about 3 mm, from about 0.3 mm to about 2.5 mm, from about 0.3 mm to about 2 mm, and all values between these levels.

According to aspects of the laminated glass structure 10 depicted in FIG. 1A, the thicknesses of the layers making up the structure can be configured such that a ratio of the thickness 21 of the core glass layer 11 to the total of the thicknesses 22a, 22b of the plurality of clad glass layers 12a, 12b is from about 0.05 to about 10, from about 0.1 to about 10, from about 2.5 to about 10, from about 2.5 to about 7.0, and all ratios between these values.

According to some aspects of the disclosure, the laminated glass structure 10 depicted in FIG. 1 can include a relatively high CTE core glass layer 11 and a relatively low CTE clad glass layer 12 laminated to each of the primary surfaces 6, 8 of the core glass layer 11. These relatively low CTE clad glass layers 12 can be laminated to the relatively high CTE core glass layer 11 by bonding the surfaces of the glass layers together at elevated temperatures such that the clad glass layers 12 fuse to the core glass layer 11. For example, an interface between each of the clad glass layers 12 and the core glass layer 11 are free of any bonding material such as, for example, an adhesive, a coating layer, or any non-glass material added or configured to adhere the respective clad layers to the core layer. Thus, each clad glass layer 12 is fused directly to the core glass layer 11 or is directly adjacent to the core glass layer. The laminated glass structure 10 is then allowed to cool. As the laminated glass structure 10 cools, the relatively high CTE core glass layer 11 contracts more than the relatively low CTE clad glass layers 12 that are securely bonded to the surfaces of the core glass layer 11. Due to the variable contraction of the core glass layer 11 and the clad glass layers 12 during cooling, the core glass layer 11 is placed in a state of tension (or tensile stress) and the clad layers 12 are placed in a state of compression (or compressive stress). This results in a mechanically strengthened, laminated glass structure 10 having a stress profile in which the compressive stress extends entirely through the clad glass layers 12. An advantageous, very deep depth of the compressive stress region (e.g., a depth-of-layer, "DOL") is thus formed in the laminated glass structure 10. Compressive stresses ("CS") at the surface of the clad glass layers 12 can range from about 50 MPa to about 400 MPa, or from about 50 MPa to about 700 MPa, and other values between these ranges, as the result of mechanical strengthening.

According to embodiments of the laminated glass structure 10 (see FIG. 1A), the plurality of clad glass layers 12 (i.e., one or more of the clad glass layers 12a, 12b) can be configured with a compressive stress region generated from an ion-exchange process; and can also be configured with an ion-exchangeable glass composition (e.g., a glass composition with one or more alkali metal ions, some of which may be exchanged with other alkali metal ions to develop residual compressive stresses). That is, the clad glass layers 12, before or after lamination with the core glass layer 11, can be configured with a compressive stress region to chemically strengthen the laminated glass structure 10 by virtue of the development of compressive stress in surface regions of the clad glass layers 12. More particularly, a compressive stress region is developed in the plurality of clad glass layers 12 such that compressive stress is present at the surface of the clad glass layers 12 and through a portion of the clad glass layers 12 to a particular depth. It should also be understood that the compressive stresses developed through chemical strengthening (e.g., an ion-exchange process) can be in addition to existing residual compressive stresses possessed by the clad glass layers 12 from mechanical strengthening (e.g., via CTE mismatch between the plurality of clad glass layers 12 and the core glass layer 11). Accordingly, the compressive stress created at the outer surfaces and near surface regions of the plurality of clad glass layers 12 can be comparable to or greater than what can otherwise be achieved by a chemical strengthening process alone.

In some implementations, the laminated glass structure 10 (see FIG. 1A) is formed with compressive stresses from both a mechanical strengthening process (e.g., via CTE mismatch of the core and clad glass layers) and a chemical strengthening process (e.g., via an ion-exchange process), resulting in a deep compressive stress region. The resulting laminated glass structure 10 has a higher combined compressive stress (CS) and/or depth of compressive stress layer (DOL) than the CS and/or DOL levels that can be achieved using either mechanical or chemical strengthening processes alone. In some embodiments, the laminated glass structure 10 is subjected to mechanical strengthening through CTE mismatch of the core and clad glass layers 11, 12 such that each of the plurality of glass layers 12 has compressive stress (CS) at its outer surfaces of over 50 MPa, over 250 MPa, in a range from about 50 MPa to about 400 MPa, from about 50 MPa to about 300 MPa, from about 250 MPa to about 600 MPa, or from about 100 MPa to about 300 MPa. Further, in some embodiments, the laminated glass structure 10 is subjected to a chemical strengthening from an ion exchange process such that each of the plurality of clad glass layers 12 has a compressive stress region with a CS of 200 MPa or greater, 300 MPa or greater, 400 MPa or greater, 500 MPa or greater, 600 MPa or greater, 700 MPa or greater, 800 MPa or greater, 900 MPa or greater, a range from 200 MPa to about 1000 MPa, or from about 200 MPa to about 800 MPa. In embodiments of the laminated glass structure 10 subjected to both mechanical and chemical strengthening, each of the plurality of clad glass layers 12 can have a compressive stress (CS) at its outer surfaces as high as 700 MPa to 1000 MPa (e.g., about 300 MPa from mechanical strengthening and about 700 MPa from chemical strengthening).

Referring again to FIG. 1A, the core glass layer 11 of the laminated glass structure 10 can be configured with a glass composition such that it has a CTE that is the same or higher than the CTE of each of the plurality of clad glass layers 12. For example, the core glass layer 11 can be formed from a glass composition which includes: from about 70 mol % to about 80 mol % $SiO_2$; from about 0 mol % to about 8 mol % $Al_2O_3$; from about 3 mol % to about 10 mol % $B_2O_3$; from about 0 mol % to about 2 mol % $Na_2O$; from about 10 mol % to about 15 mol % $K_2O$; and from about 5 mol % to about 6 mol % of alkaline earth oxide, wherein the alkaline earth oxide is at least one of CaO, SrO, and BaO without containing MgO. One example glass composition for the core glass layer 11 includes: 71.9 mol % $SiO_2$; 7.8 mol % $Al_2O_3$; 0 mol % $B_2O_3$; 10.1 mol % SrO; 0.1 mol % $SnO_2$; and 10.1 mol % BaO (also referred to as "Core P" in this disclosure, see also Table 1 below). Another example glass composition for the core glass layer 11 includes: 71.2 mol % $SiO_2$; 7.8 mol % $Al_2O_3$; 1 mol % $B_2O_3$ 10 mol % SrO; 0.1 mol % $SnO_2$; and 10 mol % BaO (also referred to as "Core Q" in this disclosure, see also Table 1 below). A further example composition for the core glass layer 11 includes: 67 mol % $SiO_2$; 21 mol % $B_2O_3$; and 13 mol % $P_2O_5$ (also referred to as "Clad GC C" in this disclosure, see also Table 2), which upon ceramming is a glass-ceramic as outlined in greater detail below. A further example glass composition for the core glass layer 11 is Corning® Eagle XG® glass. According to another implementation of the disclosure, exemplary glass compositions suitable for the core glass layer 11 are provided below in Table 1 (identified as "Core A" through "Core S"), along with average CTE values measured for each of them. It should also be understood that other glass compositions may also be used to form the core glass layer 11 of the laminated glass structure 10, provided that the average CTE of the core glass layer 11 is greater than or equal to the average CTE of each of the plurality of clad glass layers 12.

TABLE 1

Exemplary glass compositions for core layers of laminated glass structures

| (mol %) | Core A | Core B | Core C | Core D | Core E | Core F | Core G | Core H | Core I |
|---|---|---|---|---|---|---|---|---|---|
| $SiO_2$ | 61.2 | 65.7 | 63.3 | 64.9 | 61.9 | 64.54 | 67.9 | 29.8 | 71.5 |
| $Al_2O_3$ | 7.1 | 5.1 | 4.2 | 8.2 | 8.2 | 10.2 | 6.0 | 6.3 | 5.0 |
| CaO | 15.3 | 16.2 | 6.9 | 16.2 | 8.2 | 18.8 | 3.2 | 17.2 | 16.5 |
| BaO | 5.1 | 9.1 | 1.9 | 7.2 | 4.1 | 6.6 | 3.6 | 6.8 | 5.8 |
| SrO | 10.2 | 2.0 | 18.7 | 2.1 | 15.5 | 0.0 | 18.0 | 0.0 | 0.0 |
| $B_2O_3$ | 1.0 | 1.0 | 4.6 | 1.0 | 2.1 | 0.0 | 0.9 | 0.0 | 0.9 |
| MgO | 0.0 | 0.0 | 0.3 | 0.3 | 0.0 | 0.0 | 0.3 | 0.0 | 0.3 |
| ZnO | 0.0 | 1.0 | 0.0 | 0.0 | 0.0 | 0.0 | 0.0 | 0.0 | 0.0 |
| $ZrO_2$ | 0.0 | 0.0 | 0.0 | 0.0 | 0.0 | 0.0 | 0.0 | 0.0 | 0.0 |
| $SnO_2$ | 0.0 | 0.0 | 0.0 | 0.0 | 0.0 | 0.0 | 0.0 | 0.0 | 0.0 |
| $Sb_2O_3$ | 0.0 | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 | 0.0 |
| Avg. CTE RT-300° C. (ppm) | 6.7 | 6.7 | 6.7 | 6.5 | 6.5 | 6.5 | 6.5 | 6.4 | 6.3 |

| (mol %) | Core J | Core K | Core L | Core M | Core N | Core O | Core P | Core Q | Core R | Core S |
|---|---|---|---|---|---|---|---|---|---|---|
| $SiO_2$ | 67.8 | 64.6 | 69.6 | 64.7 | 70.7 | 70 | 71.8 | 71.2 | 70.5 | 71.2 |
| $Al_2O_3$ | 6.0 | 10.6 | 6.7 | 9.1 | 5.1 | 7.7 | 7.8 | 7.7 | 7.7 | 7.7 |
| CaO | 3.1 | 18.2 | 18.0 | 17.0 | 3.0 | 3.1 | 0.1 | 0.1 | 0.1 | 0.2 |
| BaO | 3.7 | 6.6 | 5.7 | 4.9 | 1.7 | 5.6 | 10.1 | 9.9 | 9.8 | 9.8 |
| SrO | 18.0 | 0.0 | 0.0 | 3.1 | 17.2 | 10.6 | 9.9 | 9.8 | 9.7 | 9.6 |
| $B_2O_3$ | 1.0 | 0.0 | 0.0 | 0.9 | 2.0 | 1.9 | 0.0 | 0.9 | 1.9 | 1.1 |
| MgO | 0.3 | 0.0 | 0.0 | 0.3 | 0.3 | 0.6 | 0.0 | 0.0 | 0.0 | 0.0 |
| ZnO | 0.0 | 0.0 | 0.0 | 0.0 | 0.0 | 0.0 | 0.0 | 0.0 | 0.0 | 0.0 |
| $ZrO_2$ | 0.0 | 0.0 | 0.0 | 0.0 | 0.3 | 0.3 | 0.0 | 0.0 | 0.0 | 0.0 |
| $SnO_2$ | 0.0 | 0.0 | 0.0 | 0.0 | 0.0 | 0.1 | 0.1 | 0.1 | 0.1 | 0.1 |
| $Sb_2O_3$ | 0.0 | 0.0 | 0.0 | 0.0 | 0.0 | 0.1 | 0.0 | 0.0 | 0.0 | 0.0 |

TABLE 1-continued

Exemplary glass compositions for core layers of laminated glass structures

| | | | | | | | | | | |
|---|---|---|---|---|---|---|---|---|---|---|
| $Na_2O$ | 0.0 | 0.0 | 0.0 | 0.0 | 0.0 | 0.0 | 0.1 | 0.1 | 0.2 | 0.1 |
| Avg. CTE RT-300° C. (ppm) | 6.3 | 6.2 | 6.2 | 6.2 | 6 | 6.0 | 5.63 | 5.67 | 5.57 | 5.8 |

Referring again to FIG. 1A, each of the plurality of clad glass layers 12 of the laminated glass structure 10 can be configured with a glass composition such that it has a CTE that is the same as or lower than the CTE of the core glass layer 11. For example, each of the clad glass layers 12a, 12b and/or the plurality of the clad glass layers 12 can be formed from a glass composition which includes: from about 65 mol % to about 70 mol % $SiO_2$; from about 9 mol % to about 14 mol % $Al_2O_3$; from about 0 mol % to about 11 mol % $B_2O_3$; from about 5 mol % to about 10 mol % alkali oxide $R_2O$, wherein R is at least one of Li, Na, and K; and from about 3 mol % to about 11 mol % of divalent oxide MO, wherein M is at least one of Mg, Ca, Ba and Zn. Another glass composition suitable for one or more of the plurality of clad glass layers 12 and/or the clad glass layers 12a, 12b includes: from about 65 mol % to about 68 mol % $SiO_2$; from about 10 mol % to about 13 mol % $Al_2O_3$; from about 6 mol % to about 9 mol % $B_2O_3$; from about 6 mol % to about 9 mol % alkali oxide $R_2O$, wherein R is at least one of Li, Na, and K; and from about 7 mol % to about 10 mol % of divalent oxide MO, wherein M is at least one of Mg, Ca, Ba and Zn. An example glass composition for the plurality of clad glass layers 12 and/or the clad glass layers 12a, 12b includes: 61.5 mol % $SiO_2$; 17.8 mol % $Al_2O_3$; 7.7 mol % $B_2O_3$; 1.7 mol % CaO; 6.7 mol % $Na_2O$; 4.1 mol % MgO; and 0.2 mol % $SnO_2$ (also referred to as "110PX" in this disclosure). It should also be understood that other glass compositions may also be used to form the plurality of clad glass layers 12 and/or the clad glass layers 12a, 12b of the laminated glass structure 10, provided that the average CTE of each of the clad glass layers 12, 12a, 12b is lower than or equal to the average CTE of the core glass layer 11.

Referring again to FIG. 1A, each of the plurality of clad glass layers 12 of the laminated glass structure 10 can be configured with a glass-ceramic composition such that it has a CTE that is the same as or lower than the CTE of the core glass layer 11. For example, each of the clad glass layers 12a, 12b and/or the plurality of the clad glass layers 12 can be formed from a glass-ceramic composition which includes: from about 35 mol % to about 75 mol % $SiO_2$; from about 10 mol % to about 40 mol % $B_2O_3$; from about 10 mol % to about 40 mol % $P_2O_5$; and each of CaO, MgO and $Bi_2O_3$ from about 0 mol % to about 5 mol %. Further, these compositions can be cerammed by subjecting them to a nucleation heat treatment at 900° C. for 2 hours, followed by a crystal growth treatment at 1000° C. to 1100° C. for about 2 hours (i.e., to form a $B(PO_4)$ crystal phase). In addition, these glass-ceramic compositions exhibit an average CTE (25-300° C.) of $40$-$65 \times 10^{-7}$/° C., dielectric constants of about 4-5, and loss tangents between $10^2$-$10^5$ Hz below 0.002. In one implementation, the clad glass layers 12 can be formed from a glass-ceramic composition which includes: from about 55 mol % to about 75 mol % $SiO_2$; from about 10 mol % to about 30 mol % $B_2O_3$; from about 10 mol % to about 35 mol % $P_2O_5$; and each of CaO, MgO and $Bi_2O_3$ from about 0 mol % to about 5 mol %. According to another implementation, exemplary glass-ceramic compositions for the clad glass layers 12 are provided below in Table 2 (identified as "Clad GC A" through "Clad GC I"), along with average CTE values measured for each of them.

TABLE 2

Exemplary glass-ceramic compositions for clad layers of laminated glass structures

| (mol %) | Clad GC A | Clad GC B | Clad GC C | Clad GC D | Clad GC E | Clad GC F | Clad GC G | Clad GC H | Clad GC I |
|---|---|---|---|---|---|---|---|---|---|
| $SiO_2$ | 58.7 | 57.4 | 67.0 | 56.8 | 62.6 | 57.2 | 62.6 | 62.9 | 54.3 |
| $B_2O_3$ | 14.1 | 13.7 | 21.0 | 13.6 | 13.3 | 13.4 | 16.2 | 19.2 | 28.0 |
| $P_2O_5$ | 27.2 | 27.0 | 13.0 | 26.5 | 21.0 | 26.2 | 18.1 | 14.9 | 14.7 |
| CaO | 0.0 | 2.0 | 0.0 | 0.0 | 0.0 | 0.0 | 0.0 | 0.0 | 0.0 |
| MgO | 0.0 | 0.0 | 0.0 | 3.1 | 3.0 | 3.0 | 3.0 | 3.0 | 3.0 |
| $Bi_2O_3$ | 0.0 | 0.0 | 0.0 | 0.0 | 0.0 | 0.0 | 0.0 | 0.0 | 0.0 |
| $SnO_2$ | 0.0 | 0.0 | 0.0 | 0.09 | 0.10 | 0.10 | 0.09 | 0.10 | 0.09 |
| Avg. CTE RT-300° C. (ppm) | 5.53 | 5.88 | 4.28 | 5.34 | 4.89 | 4.34 | 4.45 | 4.34 | 4.57 |

| (mol %) | Clad GC J | Clad GC K | Clad GC L | Clad GC M | Clad GC N |
|---|---|---|---|---|---|
| $SiO_2$ | 38 | 52.5 | 49.3 | 44.1 | 42.8 |
| $B_2O_3$ | 24.4 | 16.9 | 24.1 | 27.3 | 27 |
| $P_2O_5$ | 35.5 | 30.6 | 23.8 | 28.5 | 28.3 |
| CaO | 2.1 | 0.0 | 0.0 | 0.0 | 0.0 |
| MgO | 0.0 | 0.0 | 2.75 | 0.0 | 1.9 |
| $Bi_2O_3$ | 0.0 | 0.0 | 0.0 | 0.0 | 0.0 |
| $SnO_2$ | 0.0 | 0.0 | 0.0 | 0.0 | 0.0 |
| Avg. CTE RT-300° C. (ppm) | 5.11 | 4.83 | 5.29 | 5.48 | 5.69 |

Referring again to FIG. 1A, the laminated glass structure 10 can exhibit various properties that can enable higher frequency communication in devices without a significant reduction in performance as it relates to other non-electrical device requirements. For example, the laminated glass structure 10 can be characterized by a transmission power of at least 75% and at least 55% for signals at 28 GHz and 60 GHz, respectively, as calculated in a Three-Layer Model (described in detail below). In some embodiments, the laminated glass structure can exhibit a transmission power of at least 55%, at least 60%, at least 65%, at least 70%, at least 75%, at least 80%, or even at least 85% for signals from about 28 GHz to about 60 GHz. As another example, the laminated glass structure 10 can be characterized by a thickness weighted average dielectric constant ($D_k$) of less than 5.5 for the plurality of the clad glass layers 12 and the core glass layer 11, a property which tends to result in increased transmission power levels from 28 GHz to 60 GHz.

Figure 1B:
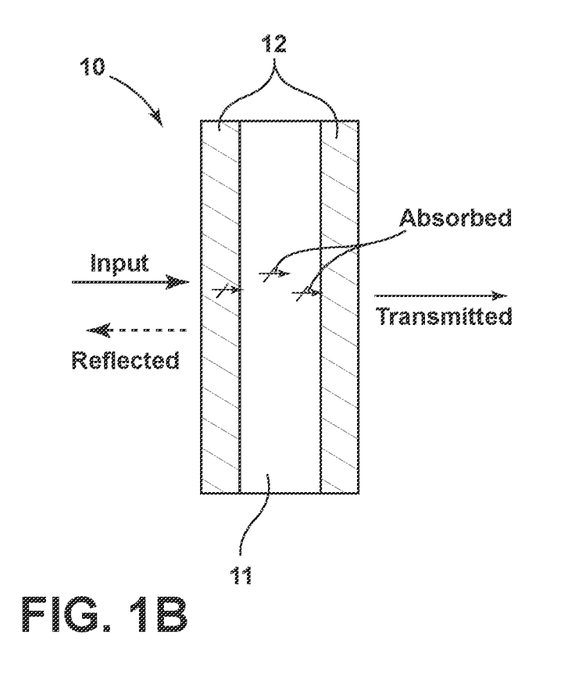
FIG. 1B is a cross-sectional, schematic view of the laminated glass structure depicted in FIG. 1A with incident and transmitted signals, according to an example of the disclosure.

Referring now to FIG. 1B, a cross-sectional, schematic view of the laminated glass structure 10 depicted in FIG. 1A is depicted. In FIG. 1B, an incident signal ("Input") is shown as impinging on one of the plurality of clad glass layers 12. Further, absorbed and reflected portions of the signal are shown in schematic form ("Absorbed" and "Reflected," respectively). In addition, the remaining portion of the signal is shown as exiting the laminated glass structure 10 as a transmitted signal ("Transmitted"). According to embodiments of the disclosure, the laminated glass structure 10 is configured to maximize the transmitted signal (e.g., as manifested in a transmission power of at least 55% from about 28 GHz to 60 GHz). Further, the issues related to transmission loss in conventional substrates and the laminated glass structure 10 of the disclosure can be enhanced at higher millimeter-wave frequencies (e.g., frequencies approaching 60 GHz) when measured relative to lower frequencies (e.g., from about 1 to 10 GHz), because of an additional reflection penalty. This additional reflection penalty is not that the reflections are stronger at higher signal frequencies, but that the lower frequency-reflected signals bounce around significantly in the structure and have a chance to reach the transmitted signal portion (not shown in FIG. 1B). The material absorptive loss associated with these structures is typically smaller than reflection losses at millimeter wave frequencies; however, millimeter wave frequency-related absorption losses are not negligible for materials such as alkali-containing glasses employed in the core glass layer 11 and/or clad glass layers 12. Accordingly, embodiments of the laminated glass structures 10 of the disclosure can be configured as a low transmission loss structure suitable for higher frequency communication by employing clad and core glass layers with low reflection and absorption-related loss characteristics.

Figure 2:
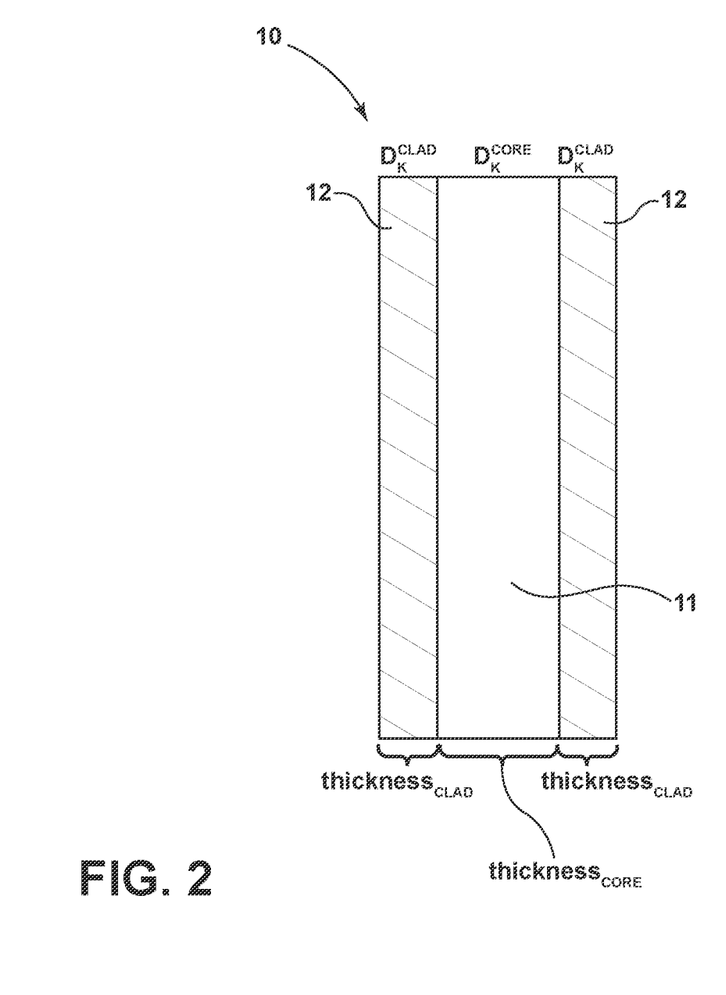
FIG. 2 is a cross-sectional, schematic view of a laminated glass structure, according to an example of the disclosure.

Aspects of the laminated glass structures 10 (see FIGS. 1A, 2) are configured for high millimeter-wave transmission while, at the same time, retaining mechanical strength through their compressive stress regions (e.g., by mechanical and/or chemical strengthening approaches). Low reflection and absorption-related loss characteristics can be achieved through the selection of the compositions and thickness of the core glass and clad glass layers 11, 12 that form the laminated glass structure 10. These features are schematically illustrated in FIG. 2, which is a cross-sectional, schematic view of a laminated glass structure 10, according to an example of the disclosure. For example, low absorption loss characteristics can be obtained by minimizing the thickness of any layers of the laminated glass structure 10 with an alkali-containing glass composition, e.g., the thickness of the clad glass layers 12 (thickness$_{CLAD}$). Low reflection loss characteristics can be obtained in the laminated glass structure 10 by employing a relatively higher dielectric constant ($D_K^{CORE}$) composition for the core glass layer 11, and a relatively lower dielectric constant ($D_K^{CLAD}$) composition for the clad glass layers 12. This combination of features in the laminated glass structure 10 results in low reflection loss characteristics because the dielectric constant gradually varies in smaller steps at each interface between the core and clad glass layers 11, 12. Further, in some embodiments, reducing the average dielectric constant of the laminated glass structure 10 can result in improved transmission characteristics at higher signal frequencies (e.g., from about 28 GHz to about 60 GHz). In other embodiments, the transmission characteristics of the laminated glass structure 10 can be improved selecting the thickness of the clad glass layers 12 (thickness$_{CLAD}$) to ensure that reflections off of the interfaces of these layers cancel. In an embodiment, the thickness of the clad glass layers 12 (thickness$_{CLAD}$) can be selected based on the dielectric constant of each of the layers 12 ($D_K^{CLAD}$) according to the following: thickness$_{CLAD}$=(c*n)/(2*f*sqrt($D_K^{CLAD}$)) where c is the speed of light, f is the millimeter-wave frequency of the signal, and n is an integer (i.e., n=1, 2, 3, 4, 5, 6, 7, . . . ).

According to some embodiments, the laminated glass structure 10 shown in FIG. 1A is configured to maximize signal transmission by minimizing its thickness weighted average dielectric constant ($D_k$) and ensuring sufficient mechanical reliability by employing ion-exchanged clad glass layers 12 with a CTE that is lower than or equal to the CTE of the core glass layer 11. According to one exemplary embodiment, the laminated glass structure 10 employs a plurality of clad glass layers 12 formed from an ion-exchanged 110PX composition with a CTE of about 50-60× $10^{-7}$° C. and a $D_k$ of about 5.2; and a core glass layer 11 formed from an ion-exchanged Core P or Core Q composition with a CTE of about 50-60×$10^{-7}$° C. and a $D_k$ of about 4.5 to 5.0. According to another exemplary embodiment, the laminated glass structure 10 employs a plurality of clad glass layers 12 formed from a glass-ceramic composition (see, e.g., Clad GC A-I in Table 2) with an average CTE (25-300° C.) of 43-59×$10^{-7}$° C.; and a core glass layer 11 formed a glass composition (see, e.g., Core A-S in Table 1) with an average CTE (25-300° C.) of 55-68×$10^{-7}$° C.

Figure 3A:
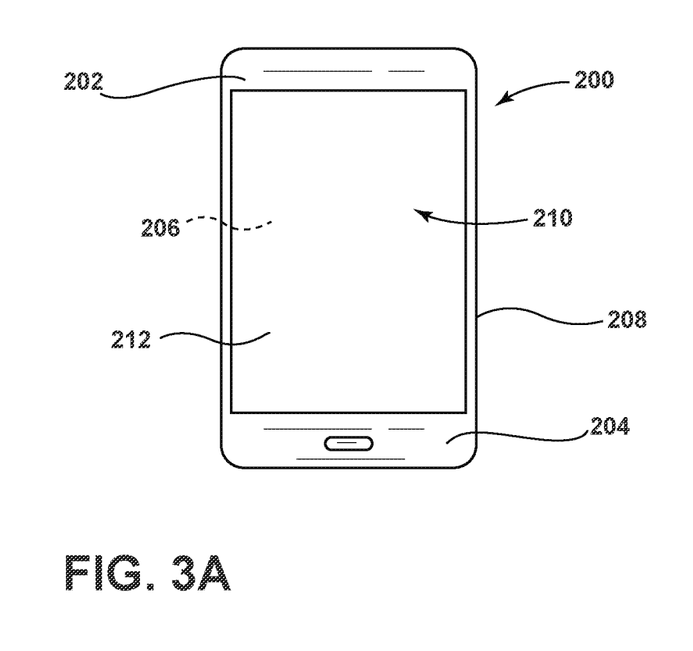
FIG. 3A is a plan view of an exemplary electronic device incorporating any of the laminated glass structures disclosed herein.
Figure 3B:
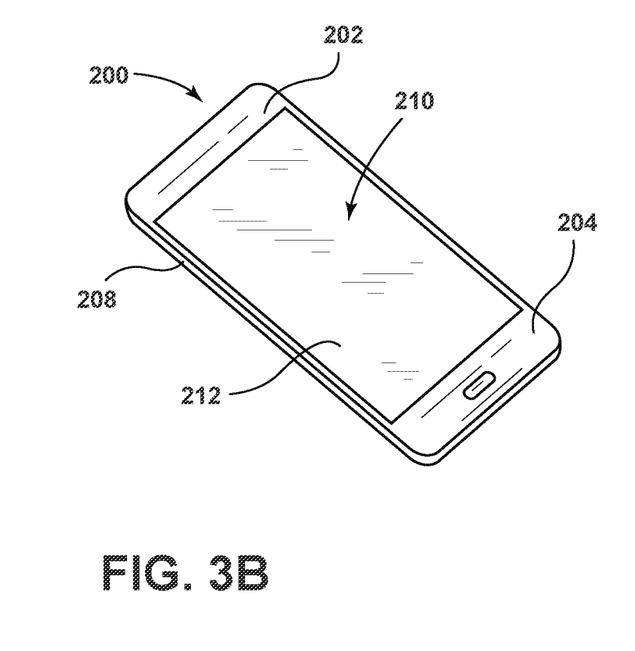
FIG. 3B is a perspective view of the exemplary electronic device of FIG. 3A.

The laminated glass structures 10 disclosed herein may be incorporated into a device article such as a device article with a display (or display device articles) (e.g., consumer electronics, including mobile phones, tablets, computers, navigation systems, wearable devices (e.g., watches) and the like), augmented-reality displays, heads-up displays, glasses-based displays, architectural device articles, transportation device articles (e.g., automotive, trains, aircraft, sea craft, etc.), appliance device articles, or any device article that benefits from some transparency, scratch-resistance, abrasion resistance or a combination thereof. An exemplary device article incorporating any of the articles disclosed herein (e.g., as consistent with the laminated glass structures 10 depicted in FIG. 1A) is shown in FIGS. 3A and 3B. Specifically, FIGS. 3A and 3B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, the cover substrate 212 and/or the housing 202 may include any of the laminated glass structures 10 disclosed herein. In some embodiments, at least one of a portion of the housing or the cover glass comprises the laminated glass structures 10 disclosed herein.

According to some embodiments, the laminated glass structures 10 may be used in a passive optical element, such as a lens, windows, lighting covers, eyeglasses, or sunglasses, any of which may or may not be integrated with an electronic display or electrically active device. In other embodiments, the laminated glass structures 10 of the disclosure can be employed in electronic devices, vehicles, buildings and other applications in the form of electronic device covers, cases and structures, display glass, windows and other similarly configured substrates.

Figure 4A:
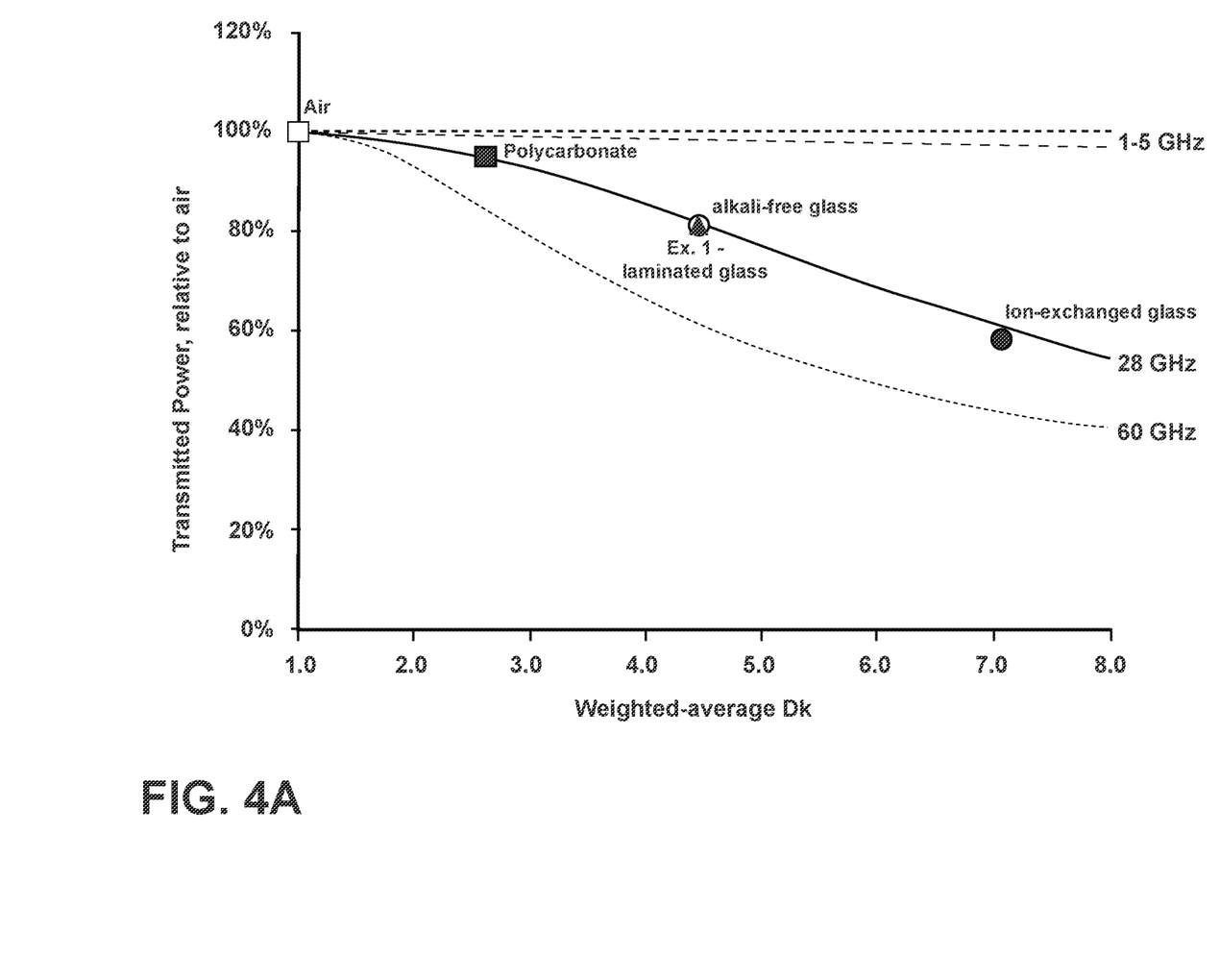
FIG. 4A is a plot of transmitted power vs. the thickness weighted average dielectric constant ($D_k$) of laminated glass structures, according to the disclosure, and a dielectric constant ($D_k$) of comparative polycarbonate, ion-exchanged glass, alkali-free glass substrate materials.

Referring now to FIG. 4A, a plot is provided of transmitted power vs. the thickness weighted average dielectric constant ($D_k$) of laminated glass structures (e.g., laminated glass structures 10, denoted as Ex. 1), and the dielectric constant ($D_k$) of comparative polycarbonate, ion-exchanged glass, alkali-free glass substrate materials. As is evident from FIG. 4A, a polycarbonate comparative substrate material is well-suited for transmission with high transmission power; however, polycarbonate materials are subject to low thermal stability and prone to scratching, leaving them unsuitable for many of the applications envisioned by the laminated glass structures of the disclosure. Comparative, monolithic ion-exchanged glass substrates, while known to have excellent scratch resistance and mechanical strength, are characterized by low transmission power levels as is evident from FIG. 4A. Comparative, monolithic alkali-free glass substrates have better transmission properties relative to ion-exchanged glass, but are not suitable for chemical strengthening. Finally, it is evident from FIG. 4A, that the laminated glass structures of the disclosure (Ex. 1) are characterized by good transmission properties comparable to those of alkali-free glass, while also demonstrating mechanical strength through mechanical and chemical strengthening effects.

Figure 4B:
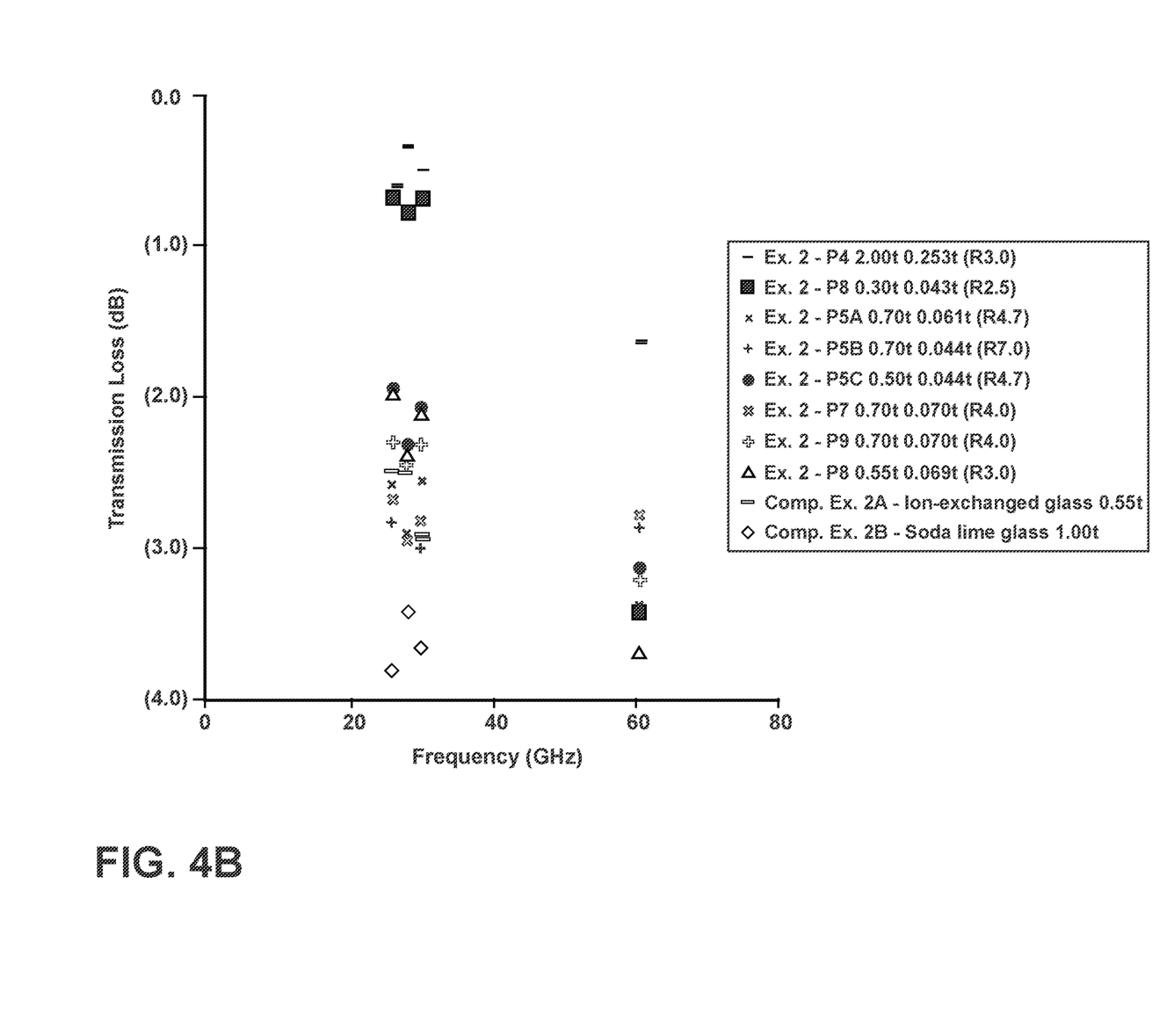
FIG. 4B is a plot of transmission loss (dB) vs. incident signal frequency (GHz) for laminated glass structures, according to the disclosure, and comparative ion-exchanged glass and alkali-free glass substrate materials.

Referring now to FIG. 4B, a plot is provided of transmission loss (dB) vs. incident signal frequency (GHz) for laminated glass structures (Exs. 2-P4 to 2-P9), according to the disclosure, and comparative ion-exchanged glass and alkali-free glass substrate materials (Comp. Exs. 2A & 2B). As noted in the legend of FIG. 4B, the comparative ion-exchanged glass substrate (Comp. Ex. 2A) has a total thickness of 0.55 mm and the comparative soda lime glass substrate (Comp. Ex. 2B) has a total thickness of 1.00 mm. The remaining laminated glass structure samples include a core glass layer and a pair of clad glass layers having thicknesses as also denoted in the legend of FIG. 4B. For example, Ex. 2-P4 is a laminated glass structure with a total thickness of 2.00 mm and a pair of clad glass layers, each with a thickness of 0.253 mm. Accordingly, the ratio of the core glass layer to the ratio of the total thickness of the clad glass layers in the Ex. 2-P4 sample is 3.0, as also indicated in the legend of FIG. 4B (i.e., "R3.0"). As is evident from FIG. 4B, the comparative ion-exchanged and soda lime glass samples (Comp. Exs. 2A & 2B) demonstrate relatively high transmission loss levels at both 28 GHz and 60 GHz in comparison to the laminated glass structure samples (Exs. 2-P4 to 2-P9). It is also evident from FIG. 4B that the laminated glass structures with lower "R" ratios (i.e., the ratio of the thickness of the core glass layer to the total thickness of the clad glass layers) tend to perform better at a transmission frequency of about 28 GHz (e.g., Ex. 2-P4 and Ex. 2-P8). At a signal transmission frequency of 60 GHz, it appears that the laminated glass structure with the largest total thickness (Ex. 2-P4, total thickness=2.00 mm) exhibited the lowest signal loss level.

Figure 5A:
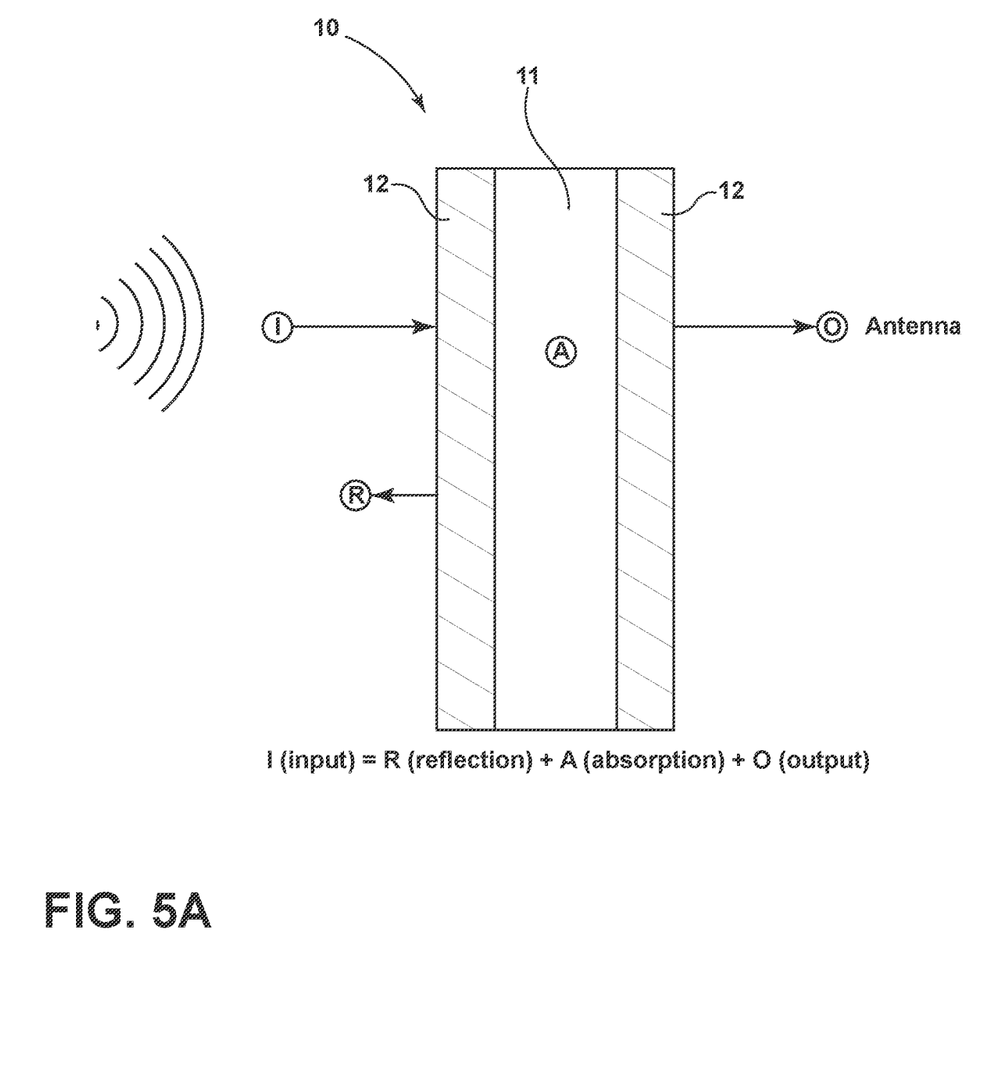
FIG. 5A is a cross-sectional, schematic view of a laminated glass structure employed in a Three-Layer Model for assessing signal loss through the structure, according to an example of the disclosure.

Referring now to FIG. 5A, a cross-sectional, schematic view is provided of a laminated glass structure 10 employed in a Three-Layer Model for assessing signal loss through the structure. The laminated glass structure 10 includes a core glass layer 11 and clad glass layers 12 (see also FIGS. 1A, 1B and 2 and their corresponding description). According to the Three-Layer Model, the transmitted output signal ("O") is given by the input signal ("I") minus the reflection and absorptive components ("R" and "A," respectively). The Three-Layer Model can be employed to estimate signal loss for various comparative substrate and laminated glass structure embodiments of the disclosure. In the Three-Layer Model, R, A, O and I are considered separately for each of the three layers of the comparative substrate and laminated glass structure embodiments of the disclosure. A relationship also exists between the layers in the model. For example, O of the first layer should be the same as I of the second layer. R of the second layer becomes the I (second order) of the first layer in the opposite direction to the I (first order) of the first layer. As such, the Three-Layer Model considers multiple back and forth signal transmissions and reflections between the layers. Unless otherwise noted, all data and estimates provided in the disclosure were generated using the Three-Layer Model and material properties obtained through sources known by those with ordinary skill in the field of the disclosure (e.g., dielectric constants, CTEs, etc.).

Figure 5B:
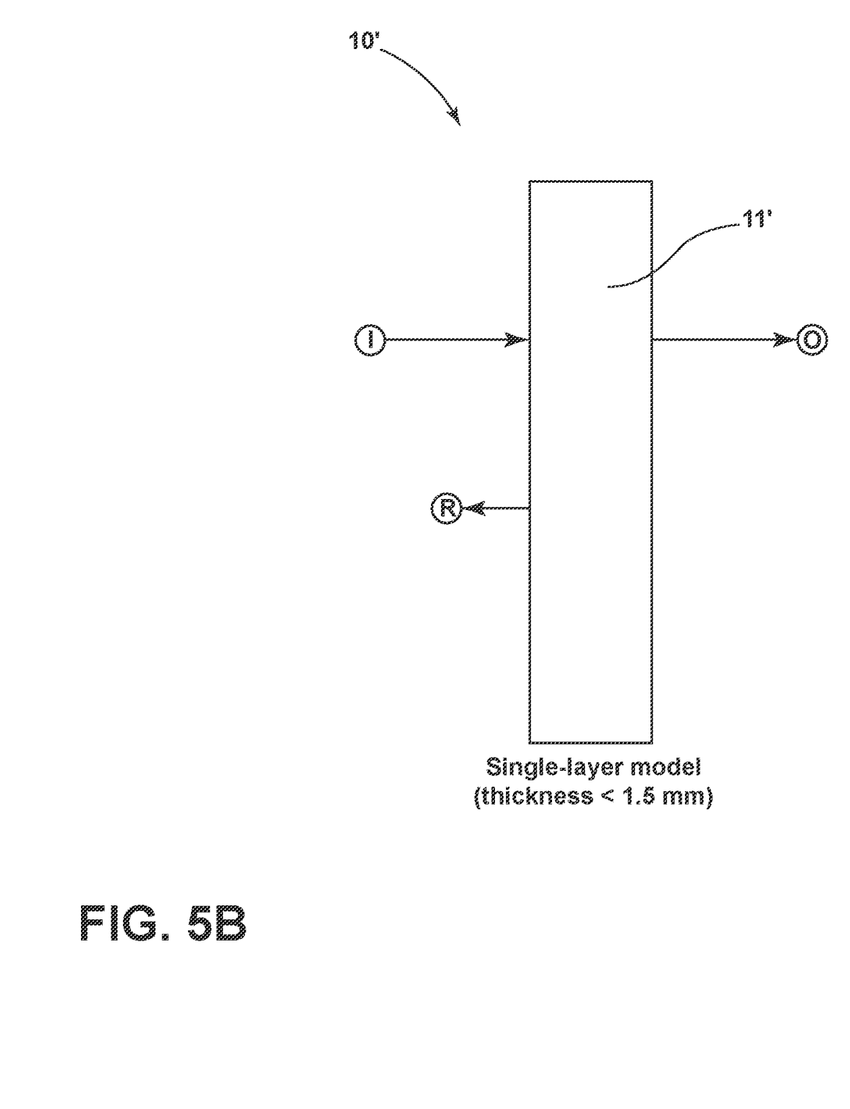
FIG. 5B is a cross-sectional, schematic view of a laminated glass structure employed in a Single-Layer Model for assessing signal loss through the structure, according to an example of the disclosure.

Referring now to FIG. 5B, a cross-sectional, schematic view is provided of a laminated glass structure 10' employed in a Single-Layer Model for assessing signal loss through the structure. In the Single-Layer Model, the laminated glass structure 10' includes a single monolithic substrate 11' that serves as a proxy for laminated glass structures configured according to the principles of the disclosure. As is evident from FIG. 5B, the Single-Layer Model can be employed to provide an effective estimate of the signal loss associated with a given laminated glass structure configuration, provided that the structure has a total thickness of less than 1.5 mm. The basis for the Single-Layer Model is the recognition that reflective losses are important and can be significantly influenced by the thickness weighted average dielectric constant of the laminated glass structure, according to some embodiments. Consequently, the influence of the dielectric constant of the clad glass layers is less significant, allowing for the simplification of the Single-Layer Model relative to the Three-Layer Model. As the Three-Layer Model employs multiple input and output signals and absorptive and reflective components, it is more comprehensive than the Single-Layer Model. Nevertheless, the Single-Layer Model provides reasonably accurate estimates and is advantageous in being easier to employ in making comparisons between particular laminated glass structure configurations.

Figure 6:
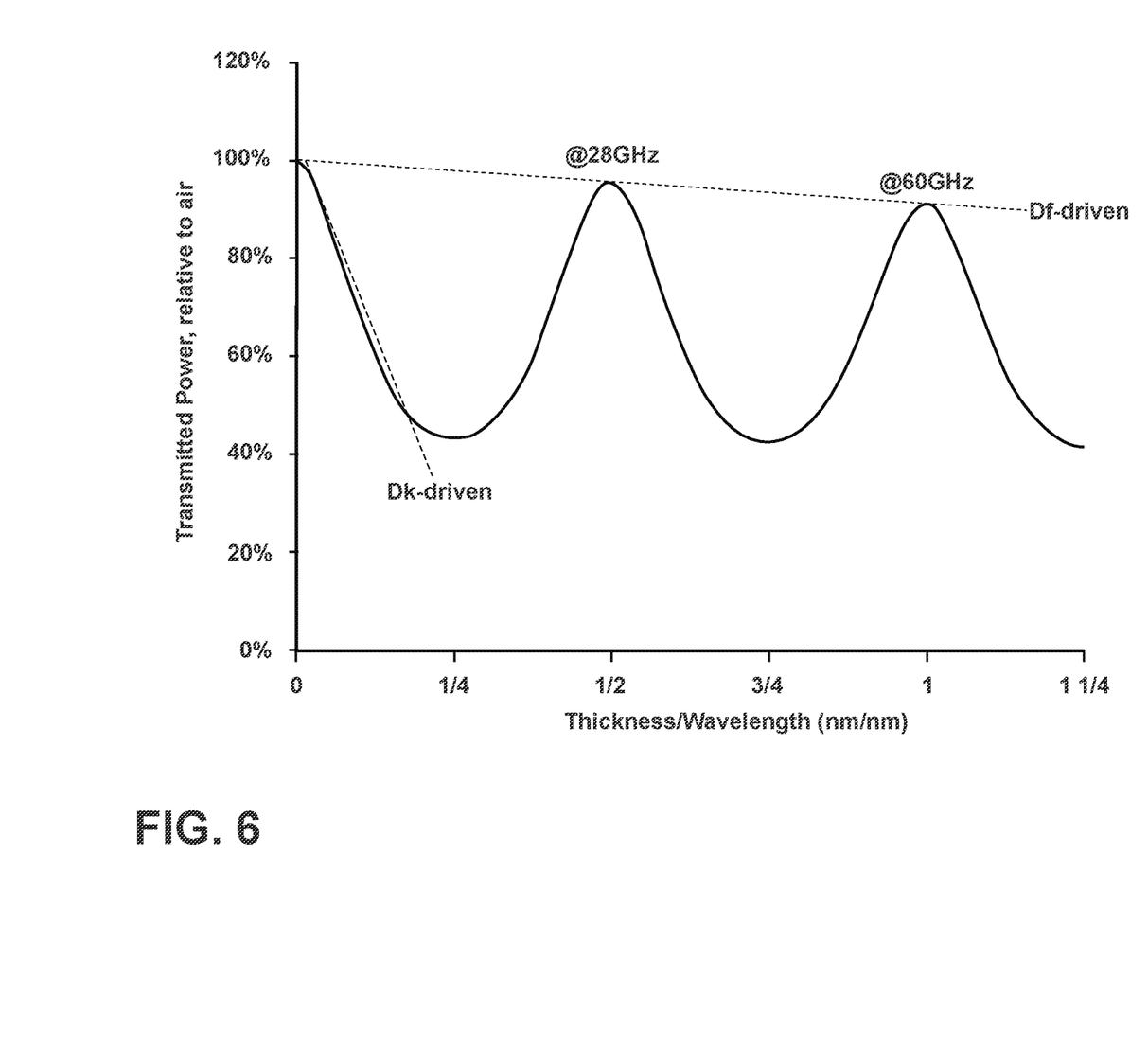
FIG. 6 is a plot of transmitted power vs. a ratio of substrate thickness to incident signal wavelength for an exemplary laminated glass structure, according to an example of the disclosure.

Referring now to FIG. 6, a plot is provided of transmitted power vs. a ratio of substrate thickness to incident signal wavelength for an exemplary laminated glass structure, e.g., laminated glass structures 10. In FIG. 6, it should be understood that typical signal wavelengths are on the order of 4-5 mm for transmission frequencies from about 28 GHz to 60 GHz. As is evident from FIG. 6, reducing the thickness of the laminated glass structure to much less than about a quarter of the wavelength or less in the structure itself (e.g., <<1 to 1.25 mm) tends to result in increased transmission power for a given combination of core and clad glass materials. Further, it is evident from FIG. 6 that the curve of transmitted power to the ratio of substrate thickness to incident signal wavelength can be shifted upward with reductions in the thickness weighted average dielectric constant ($D_k$) of the laminated glass structure, thus increasing the transmitted power of the structure for a given thickness level. As noted earlier, the thicknesses and compositions of the core glass layer and clad glass layers can be selected to reduce the thickness weighted average dielectric constant ($D_k$).

It should be emphasized that the above-described embodiments of the present disclosure, including any embodiments, are merely possible examples of implementations, merely set forth for a clear understanding of various principles of the disclosure. Many variations and modifications may be made to the above-described embodiments of the disclosure without departing substantially from the spirit and various principles of the disclosure. More generally, all such modifications and variations are intended to be included herein within the scope of this disclosure and protected by the following claims.

What is claimed is:

1. A laminated glass structure for an electronic device, comprising:
    a core glass layer having a first coefficient of thermal expansion (CTE); and
    a plurality of clad glass layers, each having a CTE that is lower than the first CTE of the core glass layer by at least $1\times10^{-7}/°$ C.,
    wherein a first of the clad layers is laminated to a first surface of the core glass layer and a second of the clad layers is laminated to a second surface of the core glass layer,
    wherein the total thickness of the core glass layer and the clad glass layers ranges from about 0.1 mm to about 3 mm, and
    further wherein the laminated glass structure is characterized by a transmission power of at least 75% and at least 55% for signals at 28 GHz and 60 GHz, respectively, as calculated in a Three-Layer Model.

2. The laminated glass structure according to claim 1, wherein the total thickness of the core glass layer and the clad glass layers ranges from about 0.1 mm to about 1 mm.

3. The laminated glass structure according to claim 1, wherein each of the plurality of clad glass layers comprise an ion-exchangeable glass composition.

4. The laminated glass structure according to claim 3, wherein each of the plurality of clad glass layers further comprises a compressive stress region formed from an ion-exchange process.

5. The laminated glass structure according to claim 1, wherein a compressive stress at a surface of the clad glass layers is about 50 MPa to about 700 MPa.

6. The laminate glass structure according to claim 1, wherein the CTE of each of the plurality of clad glass layers is lower than the CTE of the core glass layer by at least about $10\times10^{-7}/°$ C.

7. The laminated glass structure according to claim 1, wherein a ratio of the total thickness of the core glass layer to the thickness of the plurality of clad glass layers is from about 0.05 to 10.

8. The laminated glass structure according to claim 1, wherein a ratio of the total thickness of the core glass layer to the thickness of the plurality of clad glass layers is from about 2.5 to 7.

9. An electronic device, comprising:
    a housing comprising front, back and side surfaces, the laminated glass structure of claim 1 disposed as part of the housing.

10. A laminated glass structure for an electronic device, comprising:
    a core glass layer having a first coefficient of thermal expansion (CTE); and
    a plurality of clad glass layers, each having a CTE that is lower than the first CTE of the core glass layer by at least $1\times10^{-7}/°$ C.,
    wherein a first of the clad layers is laminated to a first surface of the core glass layer and a second of the clad layers is laminated to a second surface of the core glass layer,
    wherein the total thickness of the core glass layer and the clad glass layers ranges from about 0.1 mm to about 3 mm, and
    further wherein the laminated glass structure is characterized by a thickness weighted average dielectric constant ($D_k$) of less than 5.5 for the plurality of clad glass layers and the core glass layer.

11. The laminated glass structure according to claim 10, wherein the total thickness of the core glass layer and the clad glass layers ranges from about 0.1 mm to about 1 mm.

12. The laminated glass structure according to claim 10, wherein each of the plurality of clad glass layers comprises an ion-exchangeable glass composition.

13. The laminated glass structure according to claim 12, wherein each of the plurality of clad glass layers further comprises a compressive stress region formed from an ion-exchange process.

14. The laminated glass structure according to claim 10, wherein a ratio of the thickness of the core glass layer to the total thickness of the plurality of the clad glass layers is from about 0.05 to 10.

15. The laminated glass structure according to claim 10, wherein a ratio of the thickness of the core glass layer to the total thickness of the plurality of the clad glass layers is from about 2.5 to 7.0.

16. An electronic device, comprising:
    a housing comprising front, back and side surfaces; and
    electrical components that are at least partially inside the housing,
    wherein a laminated glass structure is disposed as part of the housing, the laminated glass structure comprises:
    a core glass layer having a first coefficient of thermal expansion (CTE),
    a plurality of clad glass layers, each having a CTE that is lower than the first CTE of the core glass layer by at least $1\times10^{-7}/°$ C.,
    wherein a first of the clad layers is laminated to a first surface of the core glass layer and a second of the clad layers is laminated to a second surface of the core glass layer,
    wherein the total thickness of the core glass layer and the clad glass layers ranges from about 0.1 mm to about 3 mm, and
    further wherein the laminated glass structure is characterized by a thickness weighted average dielectric constant ($D_k$) of less than 5.5 for the plurality of clad glass layers and the core glass layer.

17. The device according to claim 16, wherein the total thickness of the core glass layer and the clad glass layers ranges from about 0.1 mm to about 1 mm.

18. The device according to claim 16, wherein each of the plurality of clad glass layers comprises an ion-exchangeable glass composition.

19. The device according to claim 16, wherein each of the plurality of clad glass layers further comprises a compressive stress region formed from an ion-exchange process.

20. The device according to claim 16, wherein a ratio of the thickness of the core glass layer to the total thickness of the plurality of the clad glass layers is from about 0.05 to 10.

\* \* \* \* \*